(12) United States Patent
Watson et al.

(10) Patent No.: US 7,272,932 B2
(45) Date of Patent: Sep. 25, 2007

(54) SYSTEM AND METHOD OF USE OF EXPANSION ENGINE TO INCREASE OVERALL FUEL EFFICIENCY

(75) Inventors: David B. Watson, Waukesha, WI (US); Gregory W. Sorge, Waukesha, WI (US)

(73) Assignee: Dresser, Inc., Addison, TX (US)

( * ) Notice: Subject to any disclaimer, the term of this patent is extended or adjusted under 35 U.S.C. 154(b) by 233 days.

(21) Appl. No.: 10/730,684

(22) Filed: Dec. 8, 2003

(65) Prior Publication Data

US 2004/0244388 A1 Dec. 9, 2004

Related U.S. Application Data

(60) Provisional application No. 60/432,056, filed on Dec. 9, 2002.

(51) Int. Cl.
*F02C 1/00* (2006.01)
(52) U.S. Cl. ..................... 60/772; 60/39.182
(58) Field of Classification Search .............. 60/774, 60/791, 39.181, 39.182, 39.183, 39.465
See application file for complete search history.

(56) References Cited

U.S. PATENT DOCUMENTS

| | | | | |
|---|---|---|---|---|
| 4,317,556 A | | 3/1982 | Dietrich, III | |
| 4,359,871 A | * | 11/1982 | Strass | 48/127.3 |
| 4,677,827 A | * | 7/1987 | Shenoy et al. | 60/648 |
| 5,351,487 A | * | 10/1994 | Abdelmalek | 60/618 |
| 5,392,605 A | * | 2/1995 | Kaplan | 60/657 |
| 5,425,230 A | * | 6/1995 | Shpak | 60/39.181 |
| 5,628,191 A | * | 5/1997 | Kueck et al. | 60/655 |
| 5,685,154 A | * | 11/1997 | Bronicki et al. | 60/648 |
| 5,713,195 A | * | 2/1998 | Bronicki et al. | 60/781 |
| 5,948,221 A | | 9/1999 | Hsu | |
| 6,141,950 A | * | 11/2000 | Smith et al. | 60/783 |
| 6,141,956 A | * | 11/2000 | Iijima et al. | 60/39.182 |
| 6,155,051 A | * | 12/2000 | Williams | 60/648 |
| 6,196,021 B1 | * | 3/2001 | Wissolik | 62/606 |
| 6,209,307 B1 | * | 4/2001 | Hartman | 60/780 |

(Continued)

FOREIGN PATENT DOCUMENTS

FR 2665586 7/1992

(Continued)

OTHER PUBLICATIONS

International Search Report dated Sep. 30, 2004 for PCT/US 03/38924.

*Primary Examiner*—William H. Rodriguez
(74) *Attorney, Agent, or Firm*—Fish & Richardson P.C.

(57) ABSTRACT

A system of increasing overall fuel efficiency of a facility including a gas expansion engine for receiving a supply of pressurized gas of a first pressure and first temperature and outputting a tail gas of a second lower temperature and lower pressure. The expansion engine having a rotatable shaft as an energy output. An electric generator and/or other rotatable machinery is coupled to the rotatable shaft of the gas expansion engine. A heat exchanger may be used to transmit coldness from the tail gas of the expansion engine to an HVAC apparatus or an ice making apparatus or other plant process cooling equipment. A method of increasing overall fuel efficiency for a facility utilizing the afore described equipment is taught in the present invention.

17 Claims, 6 Drawing Sheets

U.S. PATENT DOCUMENTS

| | | | |
|---|---|---|---|
| 6,244,033 B1* | 6/2001 | Wylie | 60/783 |
| 6,327,858 B1 | 12/2001 | Negre et al. | |
| 6,351,935 B1* | 3/2002 | Bronicki et al. | 60/39.182 |
| 6,655,137 B1* | 12/2003 | Sardari | 60/517 |
| 6,820,428 B2* | 11/2004 | Wylie | 60/772 |
| 6,966,190 B2* | 11/2005 | Wylie | 60/780 |
| 2001/0029732 A1* | 10/2001 | Bachmann | 60/39.02 |
| 2003/0005699 A1* | 1/2003 | Walpita | 60/653 |
| 2003/0070432 A1* | 4/2003 | Walpita | 60/650 |
| 2004/0148941 A1* | 8/2004 | Wylie | 60/772 |
| 2004/0221581 A1* | 11/2004 | Viteri | 60/774 |
| 2005/0061002 A1* | 3/2005 | Nierenberg | 60/670 |
| 2005/0091985 A1* | 5/2005 | Yamanaka et al. | 60/772 |
| 2006/0042259 A1* | 3/2006 | Marushima et al. | 60/772 |

FOREIGN PATENT DOCUMENTS

| | | |
|---|---|---|
| JP | 54121347 A * | 9/1979 |
| WO | WO92/22741 | 12/1992 |
| WO | WO95/04872 | 2/1995 |

* cited by examiner

SYSTEM AND METHOD OF USE OF EXPANSION ENGINE TO INCREASE OVERALL FUEL EFFICIENCY

CLAIM OF PRIORITY

The present application claims priority on U.S. Provisional Application Ser. No. 60/432,056, filed Dec. 9, 2002.

TECHNICAL FIELD

The present invention relates to a system and method of use of a gas expansion engine to recover potential energy when the gas pressure is lowered and thereby increase the fuel efficiency of an industrial system containing the gas expansion engine.

BACKGROUND

Any pressurized gas contains potential energy. When the gas's pressure is lowered, by use of a gas expansion engine, it is possible to recover some of this potential energy both mechanically and/or electrically, especially when the expansion engine is coupled to an electric generator. Therefore, in any system with suitable gas volume flows and pressure regulation differentials, energy can be recovered. This can then be applied to many differing applications to increase fuel efficiency. Examples include natural gas regulation stations, process gas regulation, power plants and energy recovery from heat sources, to name but a few.

Furthermore, when the gas is expanded the gas's temperature will drop considerably. Depending upon the application, this dramatic temperature drop can be taken advantage of, for example, the "coldness" created by the pressure drop can be used for air conditioning, to make ice or to cool other elements and/or processes, to name but a few.

SUMMARY

The details of one or more embodiments of the invention are set forth in the accompanying drawings and the description below. Other features, objects, and advantages of the invention will be apparent from the description and drawings, and from the claims.

The present invention is a system of increasing overall fuel efficiency at a facility. The system includes a gas expansion engine for receiving a supply of pressurized gas of a first pressure and first temperature and outputting tail gas of a second lower temperature and a lower pressure. Additionally, the gas expansion engine outputs rotational energy via a rotating shaft. An electric generator and/or rotating machinery is driven by the rotating shaft of the gas expansion engine.

A heat exchanger may be used to transfer heat to the tail gas of the expansion engine from an HVAC apparatus, an ice making apparatus or other plant process equipment thus providing a mechanism for chilling.

At least a portion of the tail gas of the gas expansion engine may be used for fuel gas in other industrial processes or directed into a municipality gas distribution network.

A method of increasing overall fuel efficiency for a facility includes the steps of providing a supply of pressurized gas having a first pressure and first temperature to a gas expansion engine; extracting rotational energy from the gas expansion engine; using the tail gas from the outlet of the expansion engine as a source of cooling for an HVAC apparatus or an ice making apparatus or other plant process equipment.

The method may further include use of the tail gas as fuel gas in other industrial processes or directed into a distribution network for gas distribution.

DESCRIPTION OF DRAWINGS

The disclosed invention will be described with reference to the accompanying drawings, which show important sample embodiments of the invention and which are incorporated in the specification hereof by reference. A more complete understanding of the present invention may be had by reference to the following Detailed Description when taken in conjunction with the accompanying drawings, wherein.

DETAILED DESCRIPTION OF EXEMPLARY EMBODIMENTS

Figure 1:
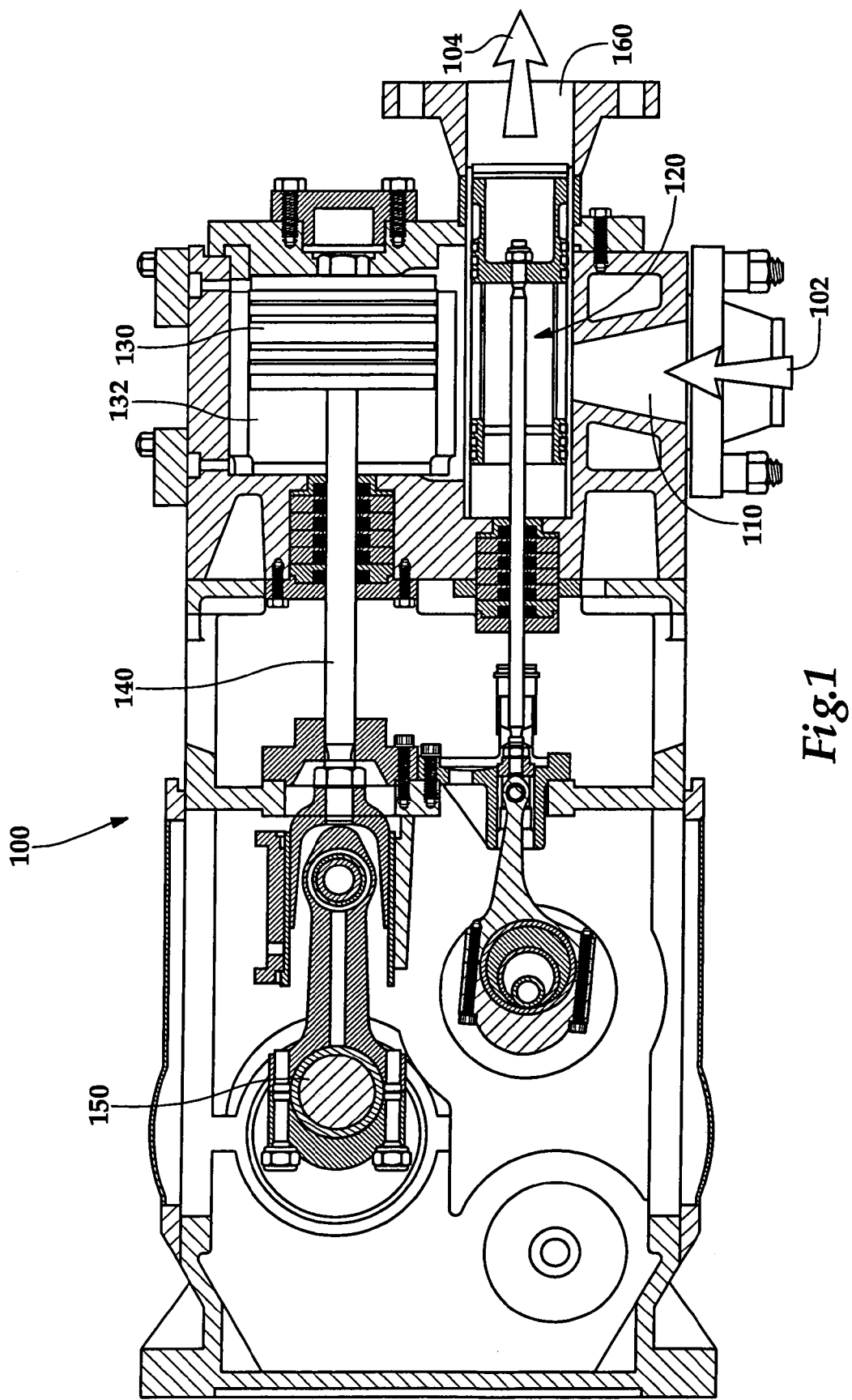
FIG. 1 is a partial cross-section of a prior art piston type gas expansion engine.

Reference is now made to the Drawings wherein like reference characters denote like or similar parts throughout the Figures.

In the present invention the basic energy source is the release of potential energy from pressurized gas through gas expansion. As used herein a gas expansion engine is any device for converting potential energy stored in high-pressure gas to mechanical energy. In a gas expansion engine, the gas engine functions as a compressor in reverse. There is no combustion in a gas expansion engine. There are two main kinds of gas expansion engines: a piston type engine and a turbo (turbine) expander type engine.

Figure 2B:
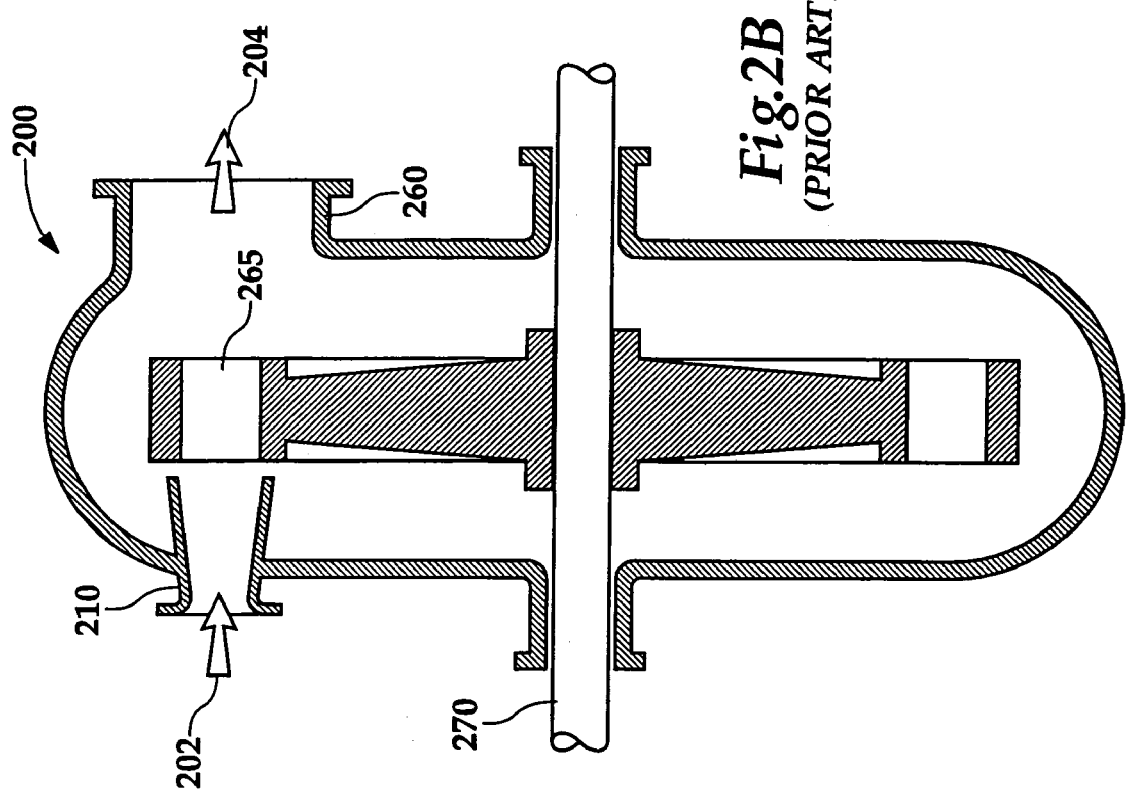
FIG. 2B is a partial schematic of a prior art turbo expander type gas expansion engine.
Figure 2A:
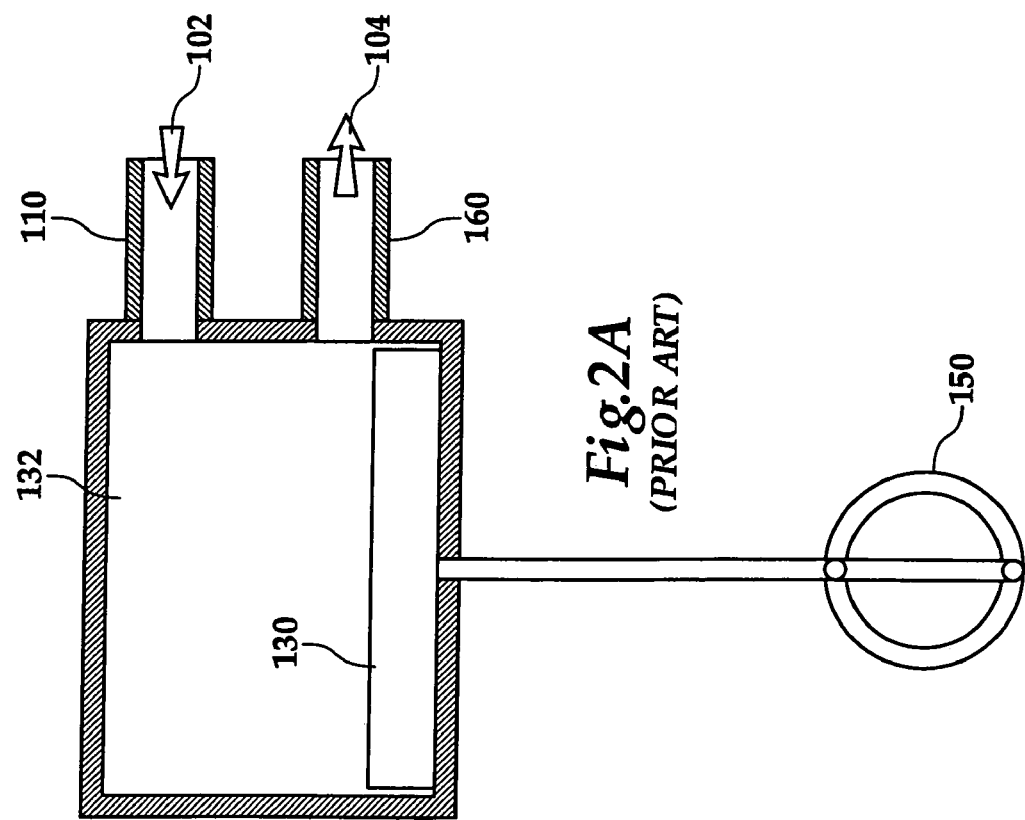
FIG. 2A is a partial schematic of a prior art piston type gas expansion engine.

Referring now to FIG. 1 wherein is disclosed a partial cross-section view of a prior art gas expansion engine 100 of the piston type. Pressurized inlet gas 102 enters the engine 100 at inlet 110 through control valve 120 and is directed to the front or backside of double acting piston 130. Piston 130 is movable connected via connecting rod 140 to crank shaft 150. As piston 140 moves back and forth in the cylinder 132, so does the connecting rod 140 thereby acting upon the crank shaft 150 and producing rotation. Lower pressure gas 104, having converted to mechanical energy some of its potential energy from being at a higher-pressure inlet gas, is expelled through gas outlet 160. Reciprocating piston gas engines are well known in the art and may contain single or double acting pistons as well as single or multiple cylinders. FIG. 2A is a schematic that illustrates how a piston type gas expansion engine converts pressure drop from the inlet gas, in the piston cylinder, into power by driving a piston attached to a rotatable shaft. FIG. 2B is a schematic that illustrates how a conventional turbo expander ("turbine engine") 200 converts pressure drop in the inlet gas 202 flowing through the turbine vanes 265 into mechanical energy through a rotatable shaft 270 attached to the turbine blades. Turbo expander engines are well known in the art. Pressurized inlet gas 202 enters inlet 210, passes through vanes 265 converting some of its potential energy to mechanical energy, is expelled as lower pressure gas 204 through gas outlet 260.

Figure 3:
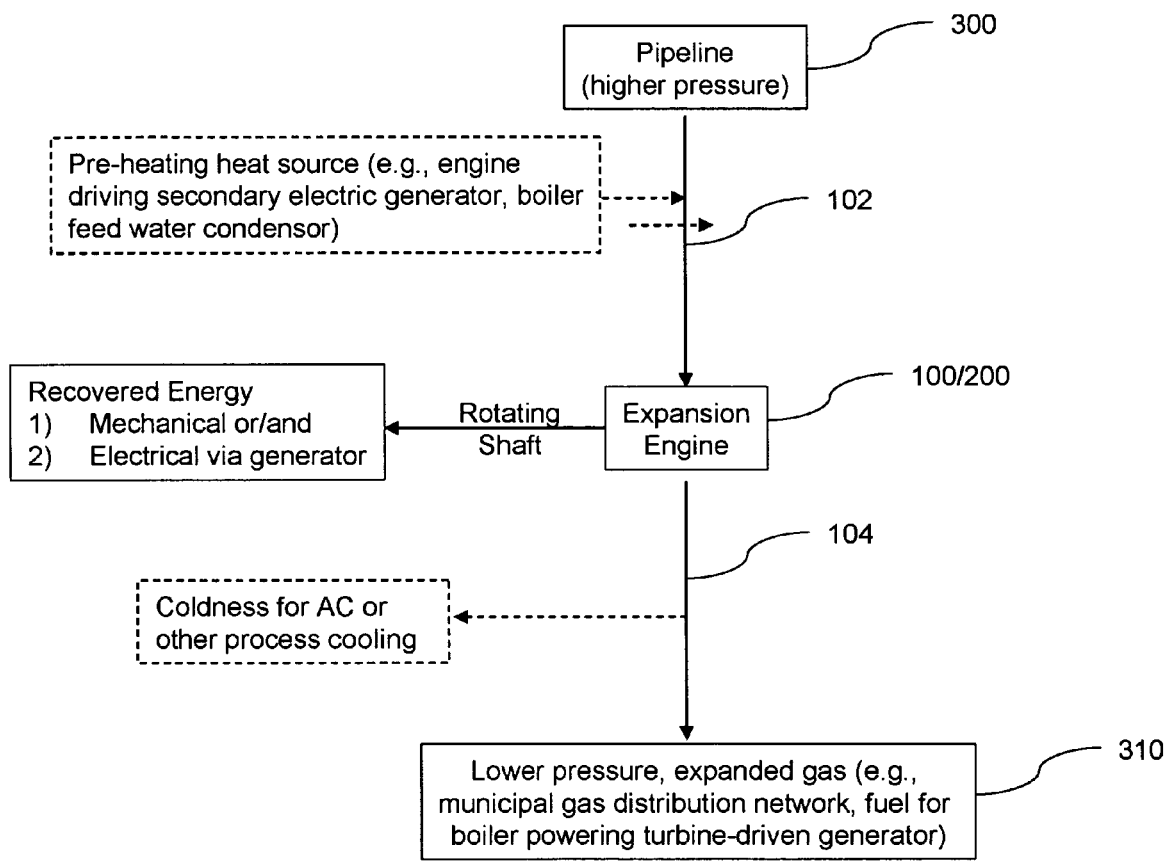
FIG. 3 is a schematic of a first embodiment of the system of the present invention.

Applications of the present invention may be initially divided into two groups: open systems and closed systems. FIG. 3 illustrates an example of an open system. Such a system might be located at a natural gas regulation station, where natural gas comes in from a high pressure pipeline 300 and exits to a lower pressure distribution network 310. Mechanical energy is recovered from the potential energy of the inlet by the gas expansion engine and can be used to drive a mechanical device and/or an electrical generator; the cooling effect of the pressure drop may be used for air conditioning, process cooling or some other form of chilling or cooling.

Figure 4:
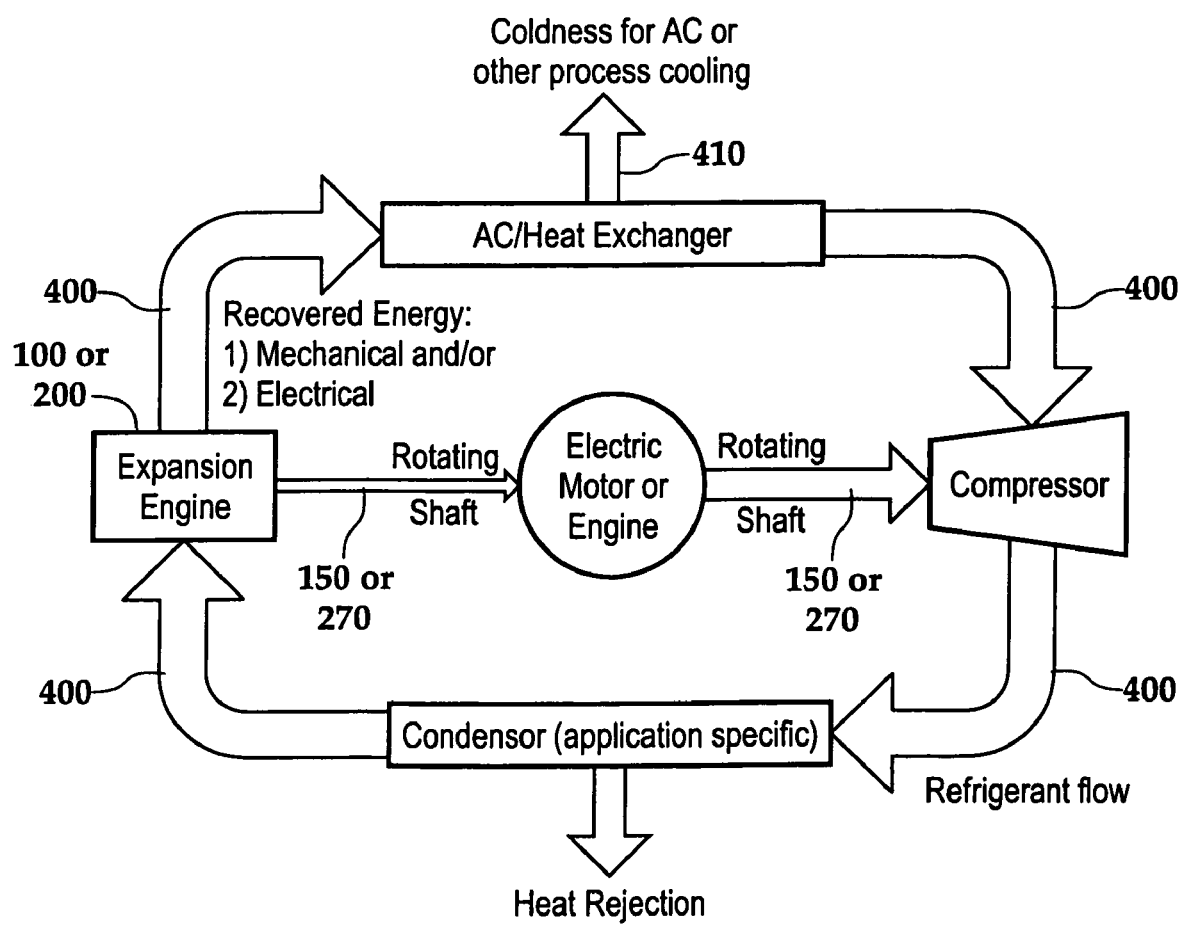
FIG. 4 is a schematic of a second embodiment of the present invention.

FIG. 4 is a schematic that illustrates an example of a closed system that may include a cooling system where a refrigerant 400 is contained and circulated around within a closed loop system. For example, the cooling effect 410 of the pressure drop can be used in air conditioning and process cooling in a plant environment, similar to a typical HVAC system. In a typical HVAC system an expansion valve would be used in place of the expansion engine. An expansion valve is incapable of capturing and transforming the potential energy (from the pressure drop and flow) into mechanical rotation. Thus when an expansion engine is used to replace the expansion valve, energy maybe recovered in the form and through a rotating shaft. This rotating shaft is then connected either directly or by some method to the compressor, thereby directly allowing the recovered energy from the expansion engine to drive the compressor. Due to overall system losses the energy from recovered by the expansion engine is less than that required to operate the compressor on a continuous basis. Therefore the additional energy may come from another device such as an electric motor. Using this scenario, the expansion engine can be considered to be aiding the electric motor as it drives the compressor, thus decreasing the amount of (electrical) energy required to drive the motor, thus saving energy and running costs. Also, it should be noted, that a smaller electric motor maybe required as its size is often determined by the electrical power requirements. This is an example of recapturing energy and making a system more energy efficient.

The gas exiting the expansion engine is at a lower temperature and pressure. As this same gas passes through the heat exchanger, the temperature of the gas will rise. This warmer temperature gas then enters the compressor. The compressor works upon the gas and thus the gas exiting the compressor will be both at a higher temperature and pressure. This gas then passes through another heat exchanger that lowers the temperature of the higher pressurized gas, which then passes to the inlet of the expansion engine. Thus the cycle continues again, as per the start of this paragraph. In FIG. 4, the expansion engine recovers less energy than is required by the compressor and thus only reduces the amount of energy required by an electric motor/generator to drive the compressor.

Figure 5:
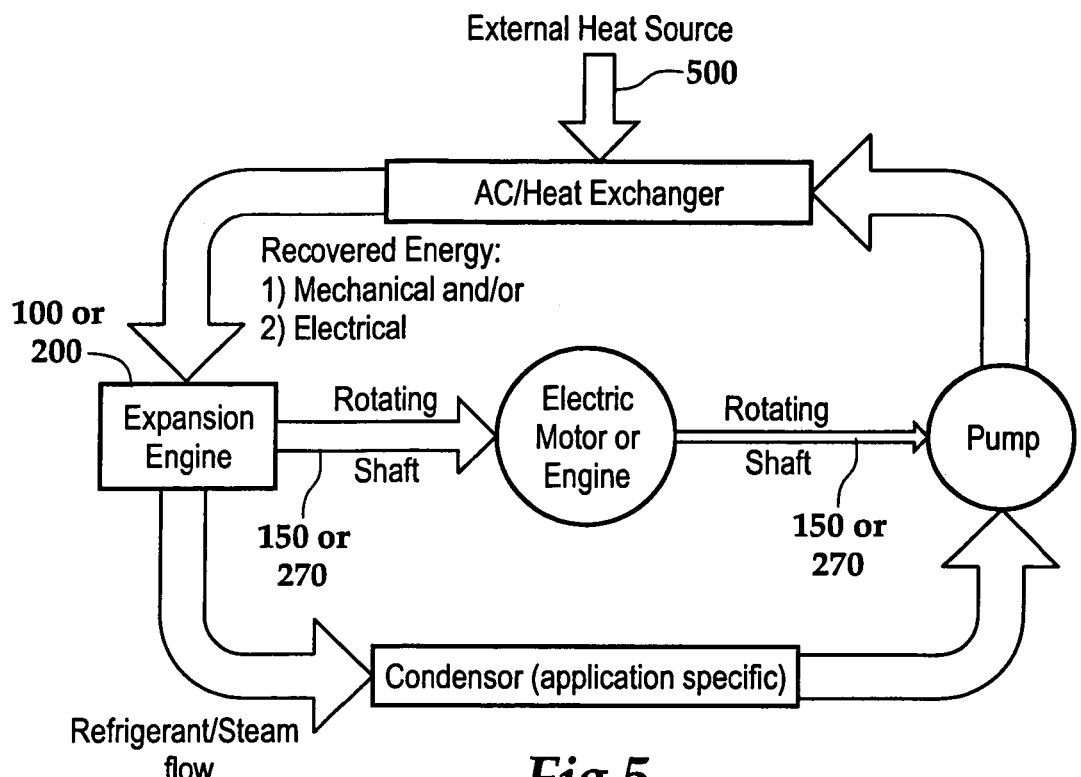
FIG. 5 is a schematic of a third embodiment of the present invention.

FIG. 5 illustrates another embodiment of a closed system of the present invention. FIG. 5 discloses use of an external heat source 500 such as heat from boiler fire gas, waste heat from engines, and waste heat from condensers to increase the fuel efficiency of the system. Whereas in the embodiment of FIG. 4 the primary purpose was to produce cooling for chilling and/or AC, whereby the expansion engine recovers energy and allows for a reduction in energy consumed by such a process, the embodiment of FIG. 5's primary purpose is convert waste heat into energy. The energy may be utilized for any number of purposes including electrical power generation or mechanical drive. Similar to FIG. 4, the expansion engine in FIG. 5 derives its energy from gas expansion. But in FIG. 5, the expansion engine recovers more energy than is required by the pump and thus is a net generator of power, typically electrical power generation through the use of the electric motor/generator acting as a generator. The energy for the net power generation is derived from transforming the waste heat that is inputted into this closed system from the external heat source via the heat exchanger.

Figure 6:
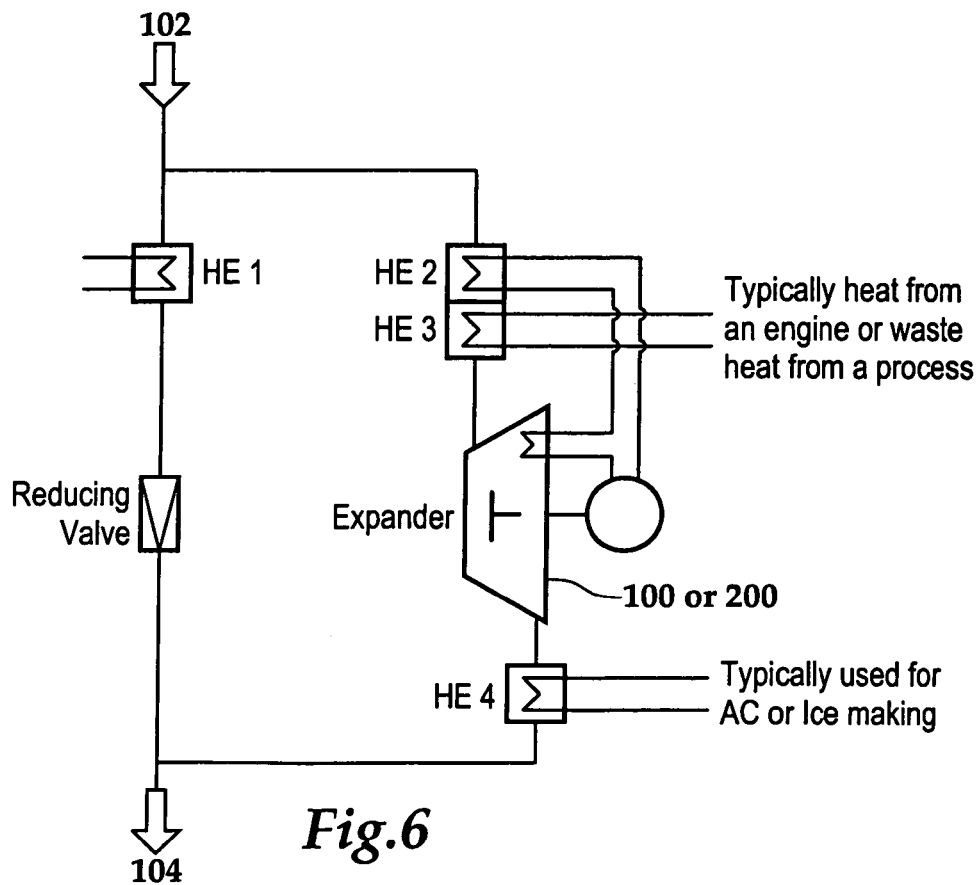
FIG. 6 is a schematic of the system of the present invention that includes multiple heat exchanges ("HE") used to increase fuel efficiency for the system.

FIG. 6 is a schematic of the system of the present invention that includes higher pressure inlet gas 102 passing through expansion engine 100 or 200 and exiting the system as lower pressure gas 104. Since the expansion engine has moving parts and typically those parts need to be lubricated, and since the temperature of the lubrication will tend to rise, FIG. 6 shows additional methods for reclaiming energy and increasing overall energy efficiencies by transferring the otherwise waste heat from the generator and expansion engine lubrication to the gas stream to be proportionally transformed back into useful mechanical energy through the expansion engine's rotating shaft and potentially into electricity via a generator. This is clearly shown through the use of multiple heat exchangers HE2 and HE3 which add waste heat to the inlet gas 102 to increase fuel efficiency. Heat exchanger HE4 takes cooling generated by the gas expansion and potentially uses the cooling for air-conditioning or ice making.

The present invention includes many benefits including reducing the total price of power generation and reducing total power consumption requirements. Analysis indicates that the average cost of power generation is typically half the cost of power produced by use of combined heat and power (CHP) units.

When the present invention is utilized in connection with an industrial facility that is not primarily an electric power generating plant, the system provides a separate uninterruptible source of electric power for the industrial facility. A separate uninterruptible non-utility based electric power source is desirable in many industrial settings. Use of the present invention may result in surplus electric power that may be sold to lower the total cost of energy to an industrial facility.

Since the invention allows for net power generation and connection to a power grid, it also allows for potential improvements of a facility's electrical power factor and thus potentially reducing financial penalties associated with power factor that the facility may incur from its electrical power supplier.

In some embodiments of the present invention, energy efficient cooling is provided by the colder outlet gas as the temperature drops as the inlet gas is expanded to the lower pressure. This cooling can be used in industrial process applications using heat exchangers for process cooling and for ice manufacturing, to name but two. Additionally, the cooling may be used as a source for air conditioning.

The present invention may be located at any location with a high-pressure source of gas. Some of these locations may be a city's fuel gas regulation station, i.e. a city gate or district station, for a natural gas distribution system. The present invention may be located in large manufacturing plants, process plants and power generation plants. Examples of some industrial plant uses include plants producing fertilizer; automotive vehicles and parts; chemical plants; paper mills; dry wall and press board plants; heat treatment facilities; steel mills and aluminum smelters. Example locations where potential air-conditioning benefits of the present invention may be used include shopping malls, airports, skyscrapers and sports stadiums.

As will be understood by those skilled in the art, the benefits, locations and uses disclosed herein are merely exemplary and not an exhaustive list of all possible uses and locations for the present invention.

Figure 7:
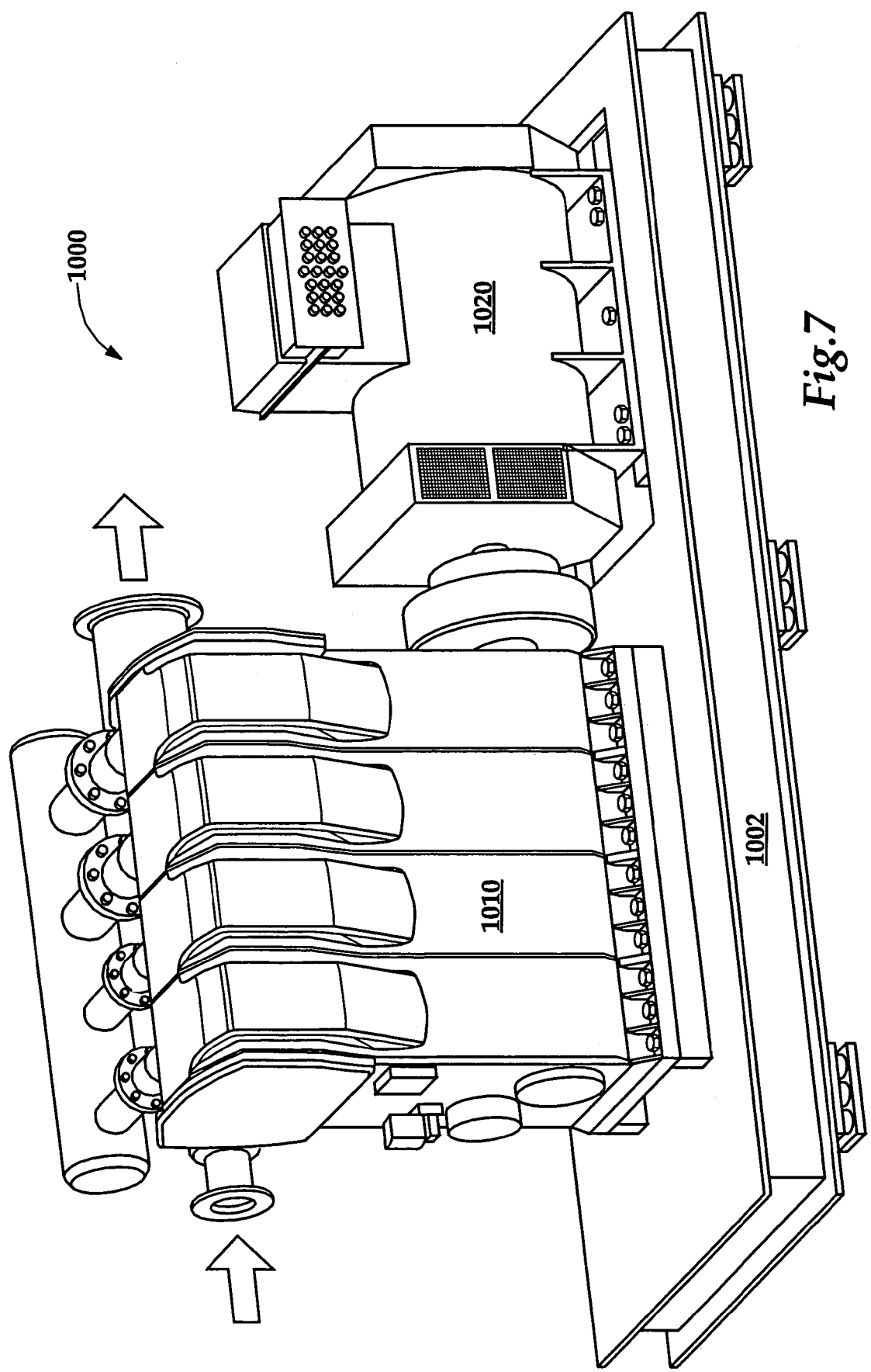
FIG. 7 is a perspective view of a skid mounted gas expansion engine coupled to an electric generator.

Referring now to FIG. 7, the present system may be prepackaged as a preassembled composite system 1000. The preassembled system 1000 may be mounted on a skid 1002 and comprise a gas expansion engine 1010 and an electric generator 1020. It will be understood by those skilled in the art that any type of rotating machinery needing a rotary power source may be used in place of the generator 1020. Such prepackaging reduces overall manufacturing and installation costs and reduces construction and installation time. Prepackaged systems may be manufactured for standard uses or may be customized for the individual site and user criteria.

One or more preferred embodiments of the invention have been illustrated in the accompanying Drawings and described in the foregoing Detailed Description. It will be understood that the invention is capable of numerous modifications without departing from the scope of the invention as claimed.

What is claimed is:

1. A system for increasing overall fuel efficiency of a facility comprising:
    a reciprocating type gas expansion engine for receiving a supply of pressurized natural gas from a natural gas pipeline, said expansion engine having a rotatable shaft as an energy output;
    an electric generator coupled to said rotatable shaft of said expansion engine for the purposes of generating electricity;
    a gas fired turbine engine(s) driving at least one secondary electric generator, said gas fired turbine engine(s) adapted to preheat the supply of pressurized gas; and
    said system adapted to direct at least a portion of reduced pressure gas from an outlet of the expansion engine to a gas consuming device.

2. A system for increasing overall fuel efficiency of a facility comprising:
    a gas expansion engine for receiving a supply of pressurized natural gas from a natural gas pipeline, said expansion engine having a rotatable shaft as an energy output;
    an electric generator coupled to said rotatable shaft of said expansion engine for the purposes of generating electricity;
    said system adapted to direct at least a portion of reduced pressure gas from an outlet of the expansion engine to a gas consuming device; and wherein the gas expansion engine is a reciprocating type expansion engine.

3. The system of claim 2 further including a source of heat used to preheat the supply of pressurized gas.

4. The system of claim 3 wherein the source of heat comes from recovered waste heat from reciprocating engine(s) driving at least one secondary electric generator.

5. The system of claim 1 wherein the source of heat comes from recovered waste heat from a plant's process via a heat exchanger.

6. The system of claim 3 wherein the source of heat comes from a boiler feed water condenser.

7. The system of claim 3 wherein the source of heat is recovered waste heat from flue gas from one or more pieces of fired process equipment.

8. A system for increasing overall fuel efficiency comprising:
    a reciprocating type gas expansion engine for receiving a supply of pressurized natural gas from a natural gas pipeline, said gas expansion engine having a rotatable shaft as an energy output;
    an electric generator coupled to said rotatable shaft of said expander engine; and
    a municipality gas distribution network for distributing at least a portion of tail gas from the gas expansion engine.

9. The system of claim 8 wherein the gas distribution network is a distribution system located downstream of a pressurized municipality gas supply gate.

10. The system of claim 8 wherein the expansion engine and the electric generator are preassembled and installed as a single unit.

11. A system for increasing overall fuel efficiency of an electric power generating plant comprising:
    a gas expansion engine for receiving a supply of pressurized gas, said expansion engine having a rotatable shaft as an energy output;
    a first electric generator coupled to said rotatable shaft of said expansion engine;
    at least one boiler supplied with at least a portion of fuel gas that has been lowered in pressure by running the supply of pressurized gas through the gas expansion engine; and
    a second generator driven by a steam turbine using steam from said at least one boiler.

12. The system of claim 11 wherein the expansion engine and the first electric generator are preassembled as a single unit and installed as a single unit.

13. The system of claim 11 wherein the gas expansion engine and electric generator are mounted on a skid for reduced installation time.

14. A method of increasing fuel efficiency comprising:
    providing a supply of pressurized natural gas from a natural gas pipeline to an inlet of a reciprocating type gas expansion engine;
    preheating the supply of pressurized gas;
    directing at least a portion of lower pressure gas from an outlet of the gas expansion engine to a gas consuming device;
    generating a rotational force as an energy output from said gas expansion engine;
    coupling said rotational force to an electric generator; and
    generating electric power using said electrical generator.

15. The method of claim 14 further including the steps of:
    using at least a portion of the lower pressure gas from the outlet of the gas expansion engine as fuel for an engine driving a second generator.

16. The method of claim 14 further including the step of using at least a portion of the lower pressure gas from the outlet of the gas expansion engine as fuel for a boiler.

17. The method of increasing fuel efficiency of claim 14 further comprising:
    directing at least a portion of lower pressure natural gas from the outlet of the gas expansion engine to a gas distribution network for a municipality.

* * * * *